United States Patent
Inoue

(10) Patent No.: US 9,842,503 B2
(45) Date of Patent: Dec. 12, 2017

(54) DRIVING SUPPORT APPARATUS AND DRIVING SUPPORT METHOD

(71) Applicant: Mitsubishi Electric Corporation, Tokyo (JP)

(72) Inventor: Yuji Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/313,436

(22) PCT Filed: Jul. 28, 2014

(86) PCT No.: PCT/JP2014/069788
§ 371 (c)(1),
(2) Date: Nov. 22, 2016

(87) PCT Pub. No.: WO2016/016922
PCT Pub. Date: Feb. 4, 2016

(65) Prior Publication Data
US 2017/0116862 A1 Apr. 27, 2017

(51) Int. Cl.
*B60Q 1/00* (2006.01)
*G08G 1/16* (2006.01)
*G01C 21/34* (2006.01)

(52) U.S. Cl.
CPC ............ *G08G 1/166* (2013.01); *G01C 21/34* (2013.01); *G08G 1/161* (2013.01)

(58) Field of Classification Search
None
See application file for complete search history.

(56) References Cited

U.S. PATENT DOCUMENTS

| | | | |
|---|---|---|---|
| 8,362,889 B2 | 1/2013 | Komori | |
| 2002/0198632 A1* | 12/2002 | Breed | B60N 2/2863 |
| | | | 701/1 |
| 2014/0368330 A1 | 12/2014 | Watanabe et al. | |
| 2015/0103175 A1* | 4/2015 | Lee | B60R 25/1001 |
| | | | 348/148 |
| 2016/0071418 A1* | 3/2016 | Oshida | G08G 1/22 |
| | | | 701/23 |

FOREIGN PATENT DOCUMENTS

| | | |
|---|---|---|
| JP | 2006-227811 A | 8/2006 |
| JP | 2008-65480 A | 3/2008 |

(Continued)

*Primary Examiner* — Julie Lieu
(74) *Attorney, Agent, or Firm* — Birch, Stewart, Kolasch & Birch, LLP

(57) ABSTRACT

An object of the present invention is to provide a technique which can enhance a possibility of giving notice of only a detected object in a dead angle area which is significant for a user. A controller causes a notification unit, in a first vehicle, to give notice of a detected object, which is determined to have an influence on a traveling of the first vehicle in a dead angle point which the first vehicle travels from among the detected object which is not detected by the first vehicle but detected by the second vehicle, as a travel influencing object based on a route information of the first vehicle, a current position information of the first vehicle, and a detected object information of the first vehicle and a second vehicle which are obtained by the information receiver.

7 Claims, 14 Drawing Sheets

(56) References Cited

FOREIGN PATENT DOCUMENTS

| JP | 2008-070955 A | 3/2008 |
|----|---------------|--------|
| JP | 2008-225786 A | 9/2008 |
| JP | 2008-293099 A | 12/2008 |
| JP | 2010-237063 A | 10/2010 |
| JP | 2013-131145 A | 10/2010 |

* cited by examiner

F I G. 1
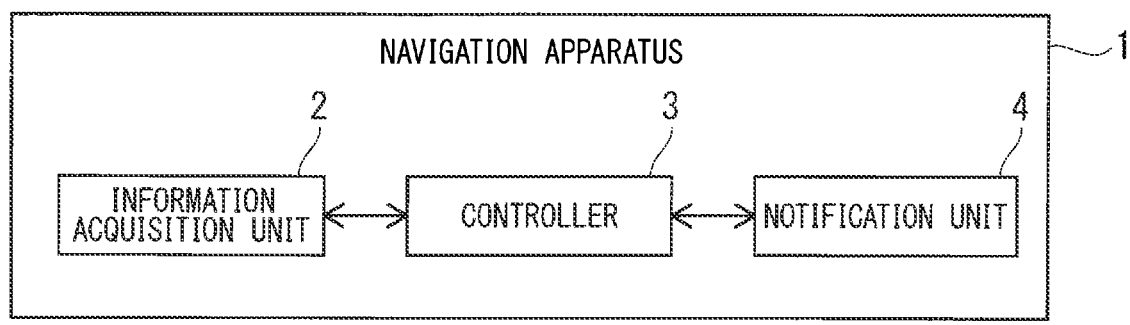

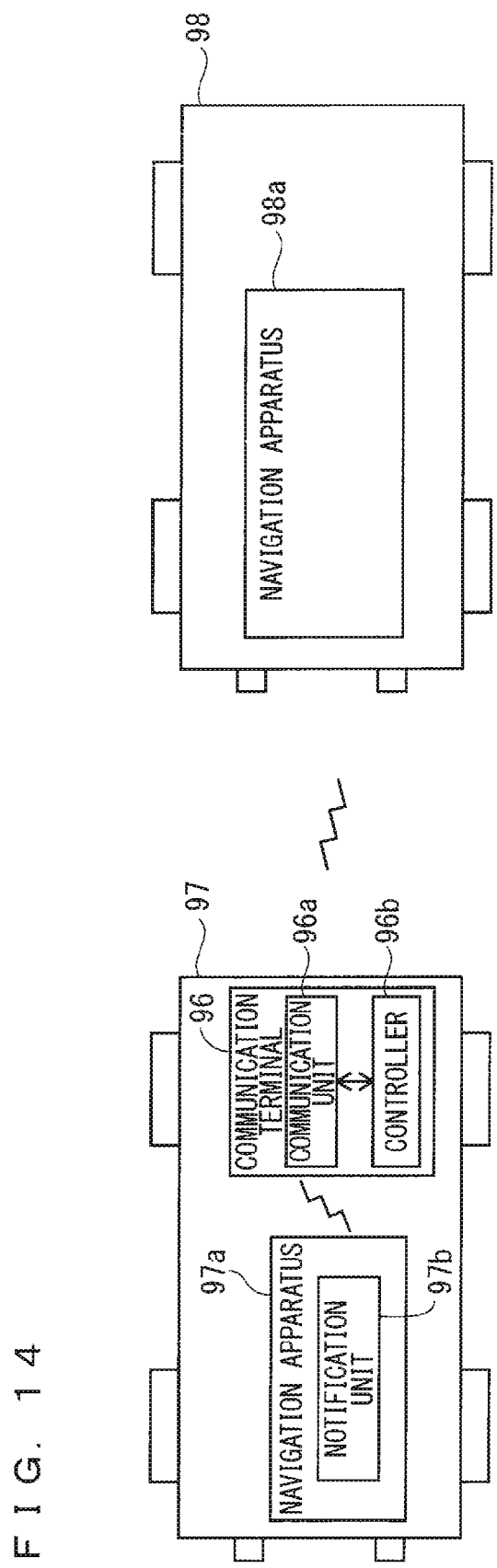

DRIVING SUPPORT APPARATUS AND DRIVING SUPPORT METHOD

TECHNICAL FIELD

The present invention relates to a driving support apparatus and a driving support method of supporting a traveling of a vehicle using a notification unit.

BACKGROUND ART

In recent years, suggested are various obstacle detecting devices which detect an obstacle in front of the own vehicle using imaging devices such as a camera mounted on an own vehicle and a millimeter wave radar to predict a collision of a vehicle. Moreover, suggested is a technique of obtaining information of a detected object such as a vehicle, for example, which may be located in a dead angle area of the own vehicle (referred to as "the dead angle-detected object" hereinafter) by receiving information, which is detected by the obstacle detecting device, from other vehicle using a vehicle-to-vehicle communication system.

A device described in Patent Document 1, for example, estimates a path of the own vehicle based on a position of the own vehicle, a speed vector of the own vehicle, or an operation of a direction indicator, for example, determines a collision risk between the own vehicle and the dead angle-detected object based on the path of the own vehicle and the information of the dead angle-detected object, and notifies a driver of the own vehicle of a warning or a collision-avoidance operation of the own vehicle when it is determined that there is a high collision risk.

PRIOR ART DOCUMENTS

Patent Documents

Patent Document 1: Japanese Patent Application Laid-Open No. 2008-293099

SUMMARY OF THE INVENTION

Problems to be Solved by the Invention

However, the technique of Patent Document 1 notifies the driver of the own vehicle of any dead angle-detected object with respect to the path of the own vehicle. As a result, it also gives notice of many detected objects, which are not significant for a user such as the driver, in the dead angle area, so that the user has to pay attention to the dead angle-detected object more than necessary, and a burden on the driver increases.

The present invention has been achieved to solve problems as described above, and it is an object of the present invention to provide a technique which can enhance a possibility of giving notice of only a dead angle-detected object which is significant for a user.

Means for Solving the Problems

A driving support apparatus according to the present invention is a driving support apparatus of supporting a traveling of a vehicle using a notification unit which includes: an information receiver obtaining a route information of a first vehicle which includes a scheduled traveling route along which the first vehicle is going to travel, a current position information of the first vehicle, a detected object information regarding a detected object around the first vehicle and a second vehicle detected by the first and second vehicles, and a scheduled traveling information of the second vehicle, and a controller causing the notification unit, in the first vehicle, to give notice of a detected object, which is determined to have an influence on a traveling of the first vehicle in a dead angle point on the scheduled traveling route along which the first vehicle travels from among the detected object which is not detected by the first vehicle but detected by the second vehicle, as a travel influencing object based on the route information of the first vehicle, the current position information of the first vehicle, the detected object information of the first and second vehicles, and the scheduled traveling information of the second vehicle which are obtained by the information receiver.

A driving support method according to the present invention is a driving support method of supporting a traveling of a vehicle using a notification unit including steps of obtaining a route information of a first vehicle which includes a scheduled traveling route along which the first vehicle is going to travel, a current position information of the first vehicle, a detected object information regarding a detected object around the first vehicle and a second vehicle detected by the first and second vehicles, and a scheduled traveling information of the second vehicle, and causing the notification unit, in the first vehicle, to give notice of a detected object, which is determined to have an influence on a traveling of the first vehicle in a dead angle point on the scheduled traveling route along which the first vehicle travels from among the detected object which is not detected by the first vehicle but detected by the second vehicle, as a travel influencing object based on the route information of the first vehicle, current position information, the detected object information of the first and second vehicles, and the scheduled traveling information of the second vehicle which are obtained.

Effects of the Invention

According to the present invention, a notice of the detected object, which has the influence on the traveling of the first vehicle in the dead angle point from among the detected object which is not detected by the first vehicle but detected by the second vehicle, is provided in the own vehicle. Thus, a possibility of giving notice of only the detected object which is significant for the user of the first vehicle can be enhanced, so that a burden on the user can be reduced.

The objects, features, preferred embodiments, and advantages of the present invention will become apparent from the following detailed description and the attached drawings.

BRIEF DESCRIPTION OF THE DRAWINGS

FIG. 1 is a block diagram showing a principal configuration of a navigation apparatus according to a preferred embodiment 1.

FIG. 14 is a block diagram showing a principal configuration of a communication terminal according to another modification example.

PREFERRED EMBODIMENTS FOR IMPLEMENTING THE INVENTION

Preferred Embodiment 1

Figure 2:
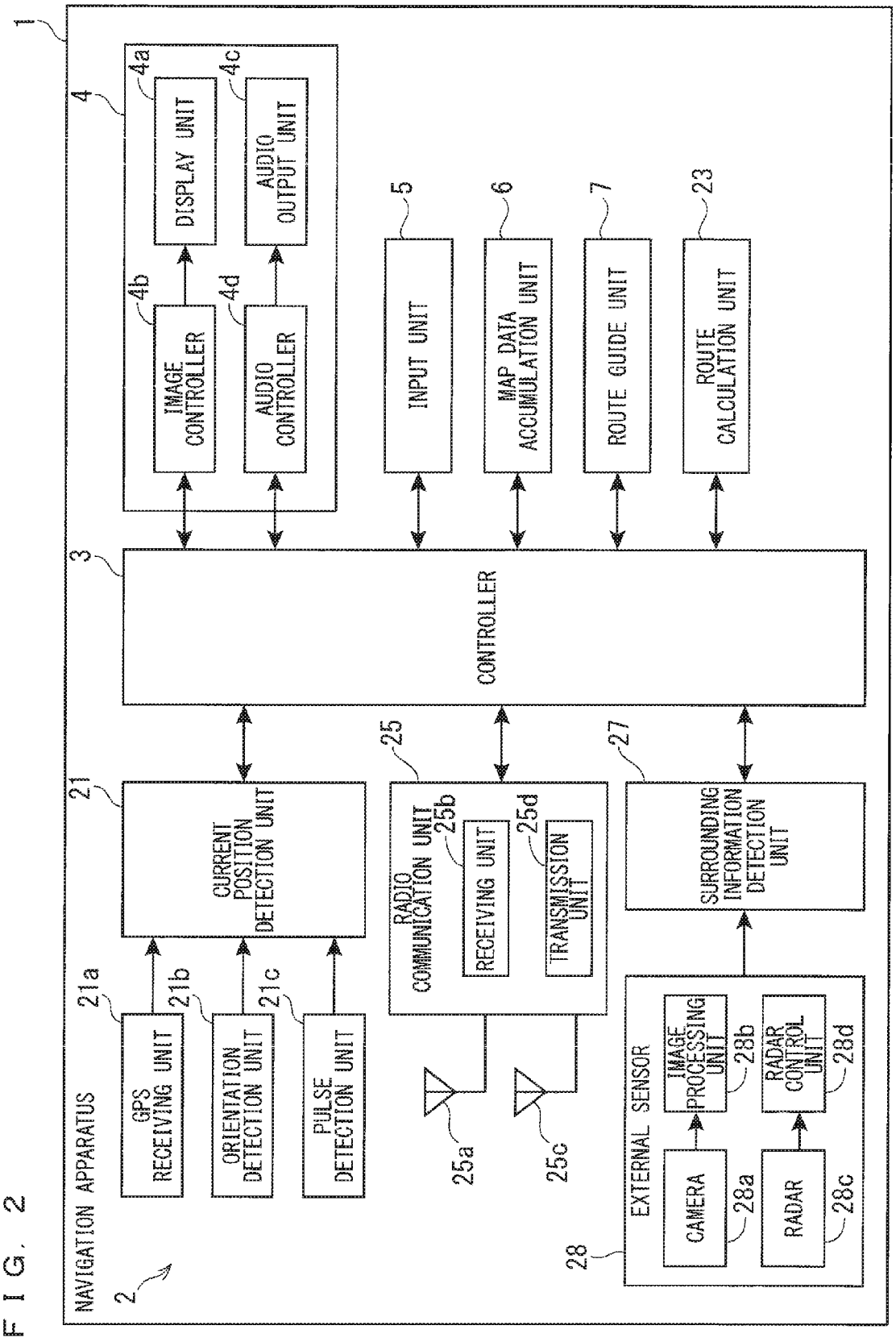
FIG. 2 is a block diagram showing a configuration of the navigation apparatus according to the preferred embodiment 1.

Described hereinafter is a case, as an example, where a driving support system according to the present invention is applied to a single navigation apparatus which can be mounted on a vehicle. FIG. 1 is a block diagram showing a principal configuration of a navigation apparatus 1 according to the preferred embodiment 1.

The following description, which is based on an assumption that the navigation apparatus 1 of FIG. 1 is mounted on a plurality of vehicle, focuses on one of the plurality of vehicles. In the following description, the one vehicle (a first vehicle), which is the focus among the plurality of vehicles, is referred to as "own vehicle", and another vehicle (a second vehicle) is referred to as "other vehicle". Although the configuration and operation of the navigation apparatus 1 in the own vehicle is described, the navigation apparatus 1 in the other vehicle also has a similar configuration and operation.

The navigation apparatus 1 of FIG. 1, which includes an information acquisition unit (receiver) 2, a controller 3, and a notification unit 4, can support a traveling of the own vehicle using the notification unit 4. The notification unit 4 is made up of at least one of a display device and a speaker, for example, to notify a user such as the driver of various information which enables the support of the traveling of the own vehicle using at least one of a display and an audio output. In the configuration of FIG. 1, the notification unit 4 is included in the navigation apparatus 1, however, the configuration is not limited to the above, so that the notification unit 4 may be included in another apparatus (for example, a communication terminal described hereinafter) instead of the navigation apparatus 1.

The information acquisition unit 2 obtains a route information indicating a route along which the own vehicle is going to travel (the route of the own vehicle), a current position information of the own vehicle, and a detected object information regarding a detected object around the own vehicle detected by the own vehicle, and also obtains a detected object information regarding a detected object around the other vehicle detected by the other vehicle. In the following description, the detected object information regarding the detected object around the own vehicle is referred to as "the detected object information of the own vehicle", and the detected object information regarding the detected object around the other vehicle is referred to as "the detected object information of the other vehicle".

Herein, a route guided by the navigation apparatus 1, for example, is adopted to the route of the own vehicle indicated by the route information.

An area around the own vehicle includes a circular area centered at the own vehicle with a radius of a maximum distance detectable by a detecting function or a fan-shaped area which is a part of the circular area, for example. The same is applied to an area around the other vehicle.

The detected object includes, for example, a moving body such as an automobile, a bicycle, and a pedestrian, or a non-moving body such as a construction signboard.

The detected object information of the own vehicle includes information of a current position of the detected object around the own vehicle, for example, and the detected object information of the other vehicle includes information of a current position of the detected object around the other vehicle, for example. When the detected object around the own vehicle is the moving body, the detected object information of the own vehicle may further include a speed information (a speed vector, for example) of the detected object around the own vehicle. Similarly, when the detected object around the other vehicle is the moving body, the detected object information of the other vehicle may further include a speed information of the detected object around the other vehicle.

The controller 3 is achieved as a function of CPU (Central Processing Unit) not shown of the navigation apparatus 1 which executes a program stored in a storage device such as a semiconductor memory not shown of the navigation apparatus 1, for example.

In the own vehicle, the controller 3 causes the notification unit 4 to give notice of a detected object, which is determined to have an influence on the traveling of the own vehicle in a dead angle point which the own vehicle travels from among the detected object which is not detected by the own vehicle but detected by the other vehicle, as a travel influencing object based on the route information of the own vehicle, the current position information of the own vehicle, the detected object information of the own vehicle, and the detected object information of the other vehicle which are obtained by the information acquisition unit 2.

Herein, the detected object which is not detected by the own vehicle but detected by the other vehicle does not include the own vehicle. Such a detected object corresponds to the dead angle-detected object which may be located in the dead angle area of the own vehicle. Accordingly, in the description hereinafter, the detected object which is not detected by the own vehicle but detected by the other vehicle is the same as the dead angle-detected object.

In the above dead angle point, the user or a manufacturer, for example, presets a point where the dead angle-detected object is assumed to be located. Assumed as such a point are, for example, at least one point of an intersection, an entrance/exit of a parking space, an entrance/exit of a destination, a junction of roads, a T-junction, a curve in a road, and a point where vehicle frequently reduce their speed or a combination of the above point and its neighborhood area (for example, sidewalk).

Applied as a standard of the above determination (the determination whether or not the detected object has the influence on the traveling of the own vehicle in the dead angle point) are, for example, a state whether or not the route of the own vehicle indicated in the route information passes through a position of the detected object in the dead angle point, whether or not the route of the own vehicle intersects with a route along which the detected object moves in the dead angle point, or whether or not the route of the own vehicle overlaps the route along which the detected object moves in the dead angle point. In the description hereinafter, the detected object is determined to have the influence on the traveling of the own vehicle in the dead angle point when the route of the own vehicle indicated in the route information passes through the position of the detected object in the dead angle point or intersects with or overlaps the route along which the detected object moves in the dead angle point, however, the determination standard is not limited to the above. The route along which the detected object moves is calculated based on the current position and the speed information of the detected object included in the detected object information, for example.

The above determination may be performed by the navigation apparatus 1 or an apparatus external to the navigation apparatus 1, when the route information of the own vehicle, the current position information of the own vehicle, and the detected object information of the own vehicle and other vehicle are provided to the external apparatus.

In the navigation apparatus 1 according to the preferred embodiment 1 described above, a notice of the dead angle-detected object which has the influence on the traveling of the own vehicle in the dead angle point, where a special attention is required, is provided in the own vehicle. Thus, a possibility of giving notice of only the detected object which is significant for the user of the own vehicle can be enhanced, so that a burden on the user of the own vehicle can be reduced.

Next, not only the principal constituent element of the navigation apparatus 1 but also its additional constituent element is described. However, an example of the above content is described below, so that the present invention is not limited to the content described below.

FIG. 2 is a block diagram showing a principal configuration and additional configuration of the navigation apparatus 1 according to the preferred embodiment 1.

The navigation apparatus 1 of FIG. 2 includes an input unit 5, a map data accumulation unit 6, and a route guide unit 7 in addition to the information acquisition unit 2, the controller 3, and the notification unit 4 described above. These constituent elements in the navigation apparatus 1 are integrally controlled by the controller 3.

The information acquisition unit 2 includes a current position detection unit 21 to detect (obtain) the current position of the own vehicle, a route calculation unit 23 to detect (obtain) the route, a radio communication unit 25 to receive (obtain) the detected object information of the other vehicle by performing the radio communication with the other vehicle, and a surrounding information detection unit 27 and an external sensor 28 to detect (obtain) the detected object information of the own vehicle. Details of each constituent element of the information acquisition unit 2 are appropriately described below.

The notification unit 4 includes a display unit 4a, an image controller 4b, an audio output unit 4c, and an audio controller 4d.

The image controller 4b causes the display unit 4a, which is made up of a display etc., to display an image such as a map information and a guide image based on an image data including the map image and the guide image being output from the controller 3. Similarly, the audio controller 4d causes the audio output unit 4c, which is made up of a speaker etc., to output audio such as a guide sound and a warning tone based on an audio data including the guide sound and the warning tone being output from the controller 3. The navigation apparatus 1 can control the notice (the display and the audio output) provided by the notification unit 4 having the above configuration, thereby supporting the traveling of the own vehicle using the notice.

The input unit 5 is made up of a push-button device or a touch panel, for example, and receives from the user a destination information to specify the destination which the own vehicle should reach. When the input unit 5 is made up of the touch panel, the input unit 5 may be integrally constituted with the display unit 4a. When the input unit 5 receives a point on the map which is scroll-displayed on the display unit 4a in accordance with an operation by the user, the point is received as the destination, and when the input unit 5 receives an address or a telephone number from the user, the address or the telephone number is received as the destination information.

The map data accumulation unit 6 is made up of a storage device such as a hard disk drive (HDD) and a RAM (Random Access Memory), for example, and stores (accumulate) the map data. The map data accumulation unit 6 may also store the map data obtained from outside the navigation apparatus 1. For example, the map data accumulation unit 6 may store the map data by downloading the map data from an external apparatus via a network, or by reading out the map data from a storage medium such as a DVD (Digital Versatile Disk)-ROM (Read Only Memory) or a Blu-Ray (R) Disc-ROM.

The current position detection unit 21 is connected with a GPS (Global Positioning System) receiving unit 21a, an orientation detection unit 21b, and a pulse detection unit 21c. The GPS receiving unit 21a receives a GPS signal from a GPS satellite and detects the current position (a coordinate of a latitude and longitude, for example) of the own vehicle based on the GPS signal. The orientation detection unit 21b is made up of a gyro sensor and an orientation sensor, for example, and detects a travel direction (an orientation, for example) of the own vehicle. The pulse detection unit 21c detects a pulse signal corresponding to a rotation number of an axle of the own vehicle per unit time and detects a travel speed and travel distance of the own vehicle based on the pulse signal.

The current position detection unit 21 having the above configuration corrects the current position received by the GPS receiving unit 21a based on a vehicle movement data (a travel direction, travel speed, and travel distance of the own vehicle) detected by the orientation detection unit 21b and the pulse detection unit 21c, thereby enabling the detection of the accurate current position of the own vehicle.

The route calculation unit 23 calculates a route from a point of departure to a destination on the map based on the point of departure such as the current position of the own vehicle detected by the current position detection unit 21, the destination received from the user by the input unit 5, and the map data stored in the map data accumulation unit 6. The calculated route includes, for example, a route requiring a short travel time (a time preferential route), a route having a short travel distance (a distance preferential route), a route requiring a less fuel (a fuel preferential route), a route to travel on a toll road as long as possible (a toll road preferential route), a route to travel on a general road as long as possible (a general road preferential route), and a route having a favorable balance of the time, distance and cost (a standard route).

The route guide unit 7 stores a route which the user selects from among the routes calculated by the route calculation unit 23 via the input unit 5, for example (referred to as "the scheduled traveling route" hereinafter). The route guide unit 7 controls the notice of the notification unit 4 based on the current position of the own vehicle in the scheduled traveling route to guide the user from the current position to the destination along the scheduled traveling route. Herein, the route information described above indicates the scheduled traveling route (the route calculated by the route calculation unit 23).

The radio communication unit 25 includes a receiving antenna 25a, a receiving unit 25b to receive various information transmitted from the other vehicle via the receiving antenna 25a, a transmission antenna 25c, and a transmission unit 25d to transmit various information which should be transmitted to the other vehicle via the transmission antenna 25c. In the preferred embodiment 1, the radio communication unit 25 performs a vehicle-to-vehicle communication to directly transmit and receive the various information with the other vehicle located in a communication available range (the other vehicle near the own vehicle). When the radio communication unit 25 performs the vehicle-to-vehicle communication, a new communication infrastructure does not have to be newly developed. However, the configuration is not limited to the above, so that the radio communication unit 25 may also have a configuration to perform a mobile communication network and a road-vehicle communication.

The radio communication unit 25 having the above configuration receives the detected object information of the other vehicle from the other vehicle and transmits the detected object information of the own vehicle to the other vehicle via the vehicle-to-vehicle communication.

The surrounding information detection unit 27, to which the external sensor 28 is connected, extracts (detects) the detected object information from information around the own vehicle detected by the external sensor 28.

The external sensor 28 includes a camera 28a which can take an image in a visible light region or an infrared region, for example, an image processing unit 28b, a radar 28c such as a laser light or a millimeter wave, for example, and a radar control unit 28d.

The camera 28a is disposed near a room mirror inside the own vehicle with respect to a front window to take an image of outside in a predetermined detection range on a front side of the own vehicle in the travel direction through the front window. A CCD (Charge Coupled Device) camera or a CMOS (Complementary Metal Oxide Semiconductor) camera, for example, is applied to the camera 28a. The image processing unit 28b performs a predetermined image processing such as filtering and binarization processing, for example, on the image taken and obtained by the camera 28a to generate an image data made up of two-dimensionally arranged pixels, and output the image data to the surrounding information detection unit 27.

The radar 28c is disposed in a nose portion of a body of the own vehicle or near the front window inside the own vehicle, for example, and transmits a transmission signal such as the laser light or the millimeter wave in an appropriate detecting direction (to a front side of the own vehicle in the travel direction, for example) under control of the radar control unit 28d. The radar 28c receives a reflected signal generated by a reflection of the transmission signal from an object located outside the own vehicle and combines the reflected signal and the transmission signal, thereby generating a beat signal and outputting the beat signal to the surrounding information detection unit 27. The radar control unit 28d controls the radar 28c accordance with a control command being input from the surrounding information detection unit 27 to the radar control unit 28d.

The surrounding information detection unit 27 determines whether or not the image data includes an image of a predetermined moving body or non-moving body, for example, to determine whether or not the image data includes an image of the detected object. When the surrounding information detection unit 27 determines that the image data includes the image, the surrounding information detection unit 27 calculates a first distance between a reference position of all images in the image data (a center position of all the image in a horizontal direction, for example) and the detected object and calculates a second distance between the detected object and the own vehicle based on the beat signal generated by the radar 28c. The surrounding information detection unit 27 calculates a relative position (a coordinate of a latitude and longitude, for example) of the detected object with respect to the position of the own vehicle in the horizontal direction based on the first distance and the second distance. Subsequently, the surrounding information detection unit 27 calculates (detects) the current position of the detected object based on the calculated relative position and the current position of the own vehicle detected by the current position detection unit 21.

When the detected object is determined to be the moving body, the surrounding information detection unit 27 obtains a temporal change of the current position of the detected object to calculate (detect) the speed information such as a speed vector of the detected object.

Operation

Figure 3:
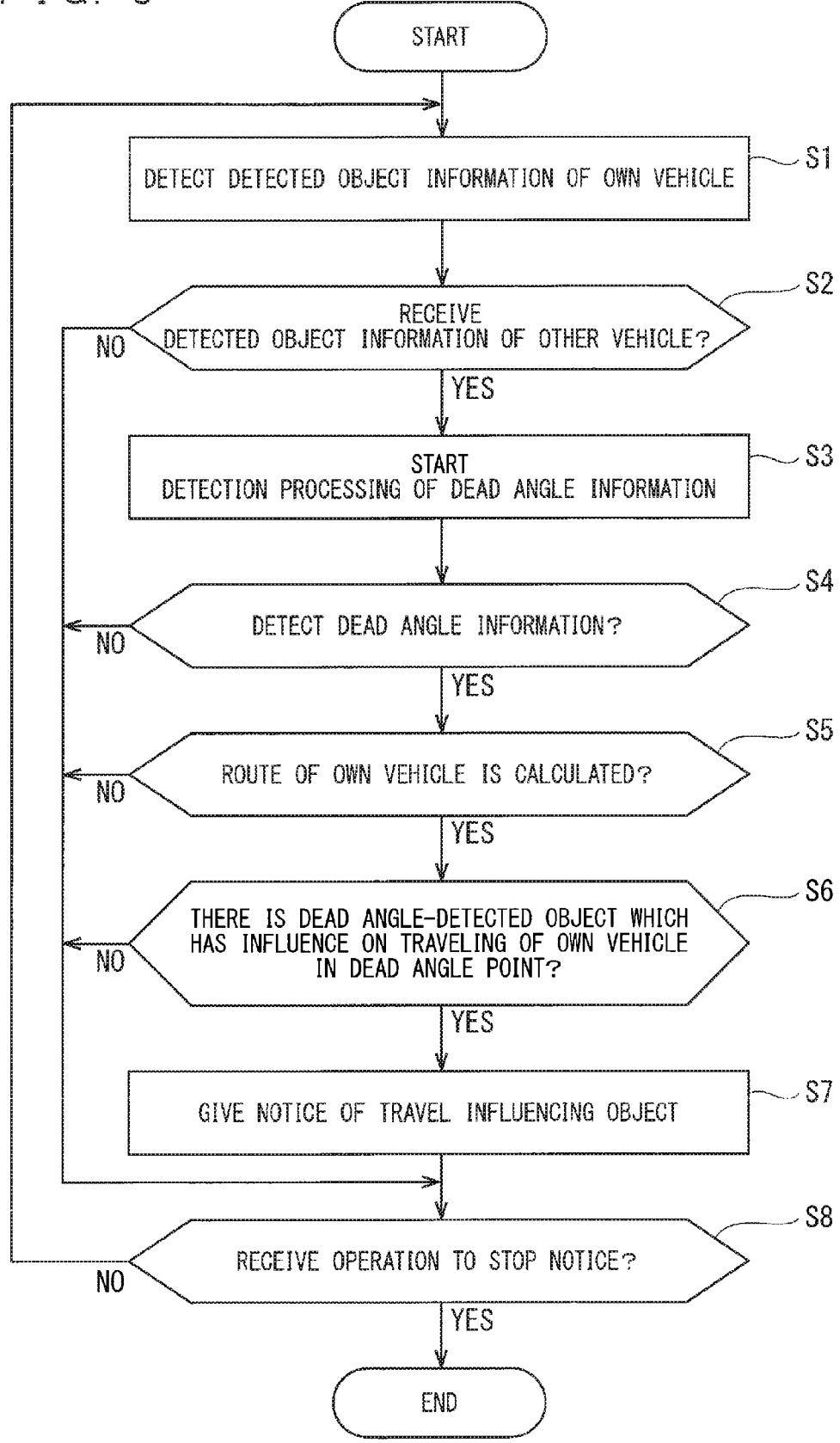
FIG. 3 is a flow chart showing an operation of the navigation apparatus according to the preferred embodiment 1.

FIG. 3 is a flow chart showing an operation of the navigation apparatus 1 of the own vehicle according to the preferred embodiment 1. The operation is achieved by the CPU, which constitutes the controller 3 of the navigation apparatus 1, executing the program stored in the storage device of the navigation apparatus 1. Next, the operation of the navigation apparatus 1 of the own vehicle is described using the flow chart in FIG. 3.

Firstly, in a step S1, the controller 3 causes the surrounding information detection unit 27 to detect the detected object information of the own vehicle.

In a step S2, the controller 3 determines whether or not the radio communication unit 25 (the receiving unit 25b) receives the detected object information of the other vehicle from the other vehicle in the communication available range. When it is determined that the radio communication unit 25 receives the detected object information of the other vehicle, the operation proceeds to a step S3, and when it is determined that the radio communication unit 25 does not receive the detected object information of the other vehicle, the operation proceeds to a step S8.

In the step S3, the controller 3 compares the detected object information of the own vehicle and the detected object information of the other vehicle to start a processing of detecting (extracting) the information of the detected object (the detected object in the dead angle area) which is not included in the detected object information of the own vehicle but included in the detected object information of the other vehicle as a dead angle information.

In a step S4, the controller 3 determines whether or not the dead angle information is detected in the step S3. When it is determined that the dead angle information is detected, the operation proceeds to a step S5, and when it is determined that the dead angle information is not detected, the operation proceeds to the step S8.

In the step S5, the controller 3 determines whether or not the route calculation unit 23 already calculates the route. For example, the controller 3 determines that the route is calculated when the route guide unit 7 performs the route guidance along the scheduled traveling route, and the controller 3 determines that the route is not calculated when the route guide unit 7 does not perform the route guidance. When it is determined that the route is calculated in the step S5, the operation proceeds to a step S6, and when it is determined that the route is not calculated, the operation proceeds to the step S8.

In the step S6, the controller 3 determines whether or not there is the dead angle-detected object which has the influence on the traveling of the own vehicle in the dead angle point which the own vehicle travels based on the scheduled traveling route (the route calculated by the route calculation unit 23), the dead angle information which is determined to be detected in the step S4, and a map data stored in the map data accumulation unit 6. When it is determined that there is the dead angle-detected object, the operation proceeds to a step S7, and when it is determined that there is no dead angle-detected object, the operation proceeds to the step S8.

In the step S7, the controller 3 causes the notification unit 4 to give notice of the dead angle-detected object, which is determined to have the influence on the traveling of the own vehicle in the step S6, as the travel influencing object. For example, the controller 3 causes the notification unit 4 to display the current position and travel direction (the direction of the speed vector) of the travel influencing object with emphasis or output the sound from the notification unit 4. Accordingly, the notification unit 4 of the own vehicle gives notice (displays and outputs the sound) of the position and travel direction of the travel influencing object in the dead angle point. Subsequently, the operation proceeds to the step S8.

In the step S8, the controller 3 determines whether or not the input unit 5 receives an operation to stop the notice of the travel influencing object performed by the notification unit 4. When it is determined that the input unit 5 receives the operation, the controller 3 stops the notice of the travel influencing object performed by the notification unit 4 and finishes the operation shown in FIG. 3. In contrast, when it is determined that the input unit 5 does not receive the operation, the operation returns to the step S1.

Operation Example 1

Figure 4:
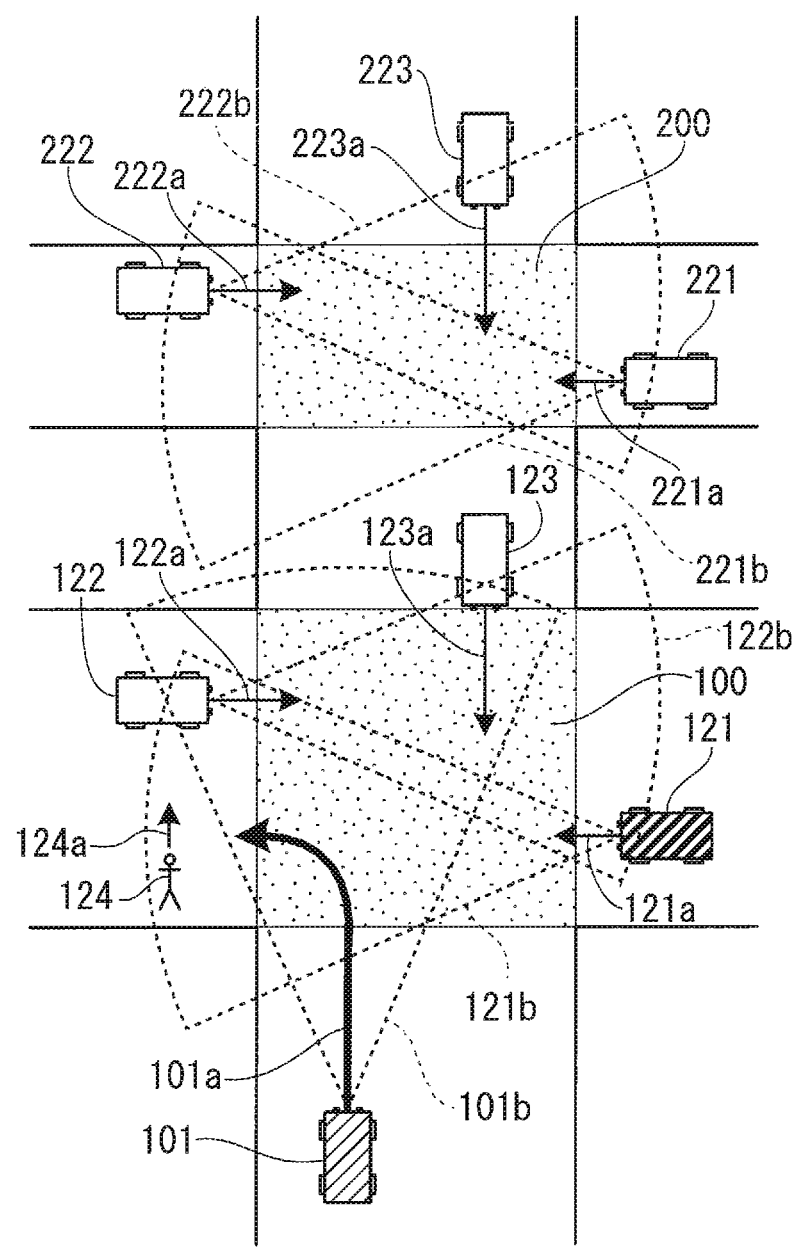
FIG. 4 is a diagram for explaining an operation example 1 of the navigation apparatus according to the preferred embodiment 1.

FIG. 4 is a diagram for explaining an example of the operation indicated by the flow chart in FIG. 3.

FIG. 4 illustrates an own vehicle 101, a scheduled traveling route 101a of the own vehicle 101, and a detection range 101b of the external sensor 28 of the own vehicle 101. FIG. 4 also illustrates other vehicles 121, 122, 123, 221, 222, and 223, travel directions 121a, 122a, 123a, 221a, 222a, and 223a of the other vehicles, and detection ranges 121b, 122b, 221b, and 222b of the external sensors 28 of the other vehicles 121, 122, 221, and 222.

FIG. 4 further illustrates a pedestrian 124, a moving direction 124a of the pedestrian, intersections 100 and 200, and a map around the own vehicle 101. The scheduled traveling route 101a of the own vehicle 101, which is indicated by a thick arrow in FIG. 4, indicates a route for turning left at the intersection 100. In FIG. 4, the dead angle points which the own vehicle 101 travels are the intersection 100 and a sidewalk thereof.

The operation indicated by the flow chart in FIG. 3 applying a positional relationship shown in FIG. 4 is described below.

(Step S1)

The navigation apparatus 1 of the own vehicle 101 detects the detected object in the detection range 101b of the external sensor 28 to detect the detected object information of the own vehicle. In case of the positional relationship shown in FIG. 4, the detected objects of the own vehicle 101 are as follows.

The detected objects of the own vehicle 101: the other vehicles 122 and 123

(Step S2)

The navigation apparatus 1 of the own vehicle 101 receives the detected object information of the other vehicle from the other vehicles 121, 122, 221, and 222. In case of the positional relationship shown in FIG. 4, the detected objects of the other vehicles 121, 122, 221, and 222 indicated as the detected object information of the other vehicle are as follows.

The detected objects of the other vehicle 121: the other vehicle 122 and the pedestrian 124

The detected objects of the other vehicle 122: the other vehicles 121 and 123

The detected object of the other vehicle 221: the other vehicle 222

The detected objects of the other vehicle 222: the other vehicles 221 and 223

(Step S3)

The navigation apparatus 1 of the own vehicle 101 compares the detected object of the own vehicle 101 detected in the step S1 and the detected object of the other vehicles 121, 122, 221, and 222 detected in the step S2. The navigation apparatus 1 detects the information of the detected objects (the other vehicles 121, 221, 222, and 223 and the pedestrian 124) which are not included in the detected object information of the own vehicle but included in the detected object information of the other vehicle as the dead angle information of the own vehicle 101.

(Step S4)

In the example of FIG. 4, the dead angle information is detected in the step S3, so that the operation proceeds to the step S5.

(Step S5)

The navigation apparatus 1 of the own vehicle 101 determines whether or not there is the route guidance for the user of the own vehicle 101 to the destination along the scheduled traveling route. In the example of FIG. 4, there is the route guidance of the scheduled traveling route 101a for turning left at the intersection 100, so that the operation proceeds to the step S6.

(Step S6)

The navigation apparatus 1 of the own vehicle 101 determines whether or not there is the detected object which has the influence on the traveling of the own vehicle 101 from among the detected objects detected in the step S3 (the other vehicles 121, 221, 222, and 223 and the pedestrian 124) in the dead angle point (the intersection 100 and the sidewalk thereof) which the own vehicle 101 travels.

Since the scheduled traveling route 101a of the own vehicle 101 overlaps a route (a route calculated based on a current position and the travel direction 121a of the other vehicle 121) along which the other vehicle 121 travels at the intersection 100, the other vehicle 121 is determined to have the influence on the traveling of the own vehicle 101. Moreover, since the scheduled traveling route 101a of the own vehicle 101 intersects with a route along which the pedestrian 124 moves at the sidewalk of the intersection 100, the pedestrian 124 is determined to have the influence on the traveling of the own vehicle 101.

Since the scheduled traveling route 101a of the own vehicle 101 does not intersect with or overlap routes along which the other vehicles 221, 222, and 223 travel at the intersection 100 or the sidewalk, the other vehicles 221, 222, and 223 are determined not to have the influence on the traveling of the own vehicle 101.

(Step S7)

The navigation apparatus 1 of the own vehicle 101 gives notice, from the notification unit 4, of the other vehicle 121 and the pedestrian 124 which are determined to have the influence on the traveling of the own vehicle 101 in the step S6 from among the detected objects detected in the step S3 (the other vehicles 121, 221, 222, 223, and the pedestrian 124), thereby providing a warning thereof.

(Step S8)

The operation returns to the step S1 and repeats the above operation again unless the user performs an operation for stopping the notice on the navigation apparatus 1 of the own vehicle 101 in accordance with a necessity of the warning.

Operation Example 2

Figure 5:
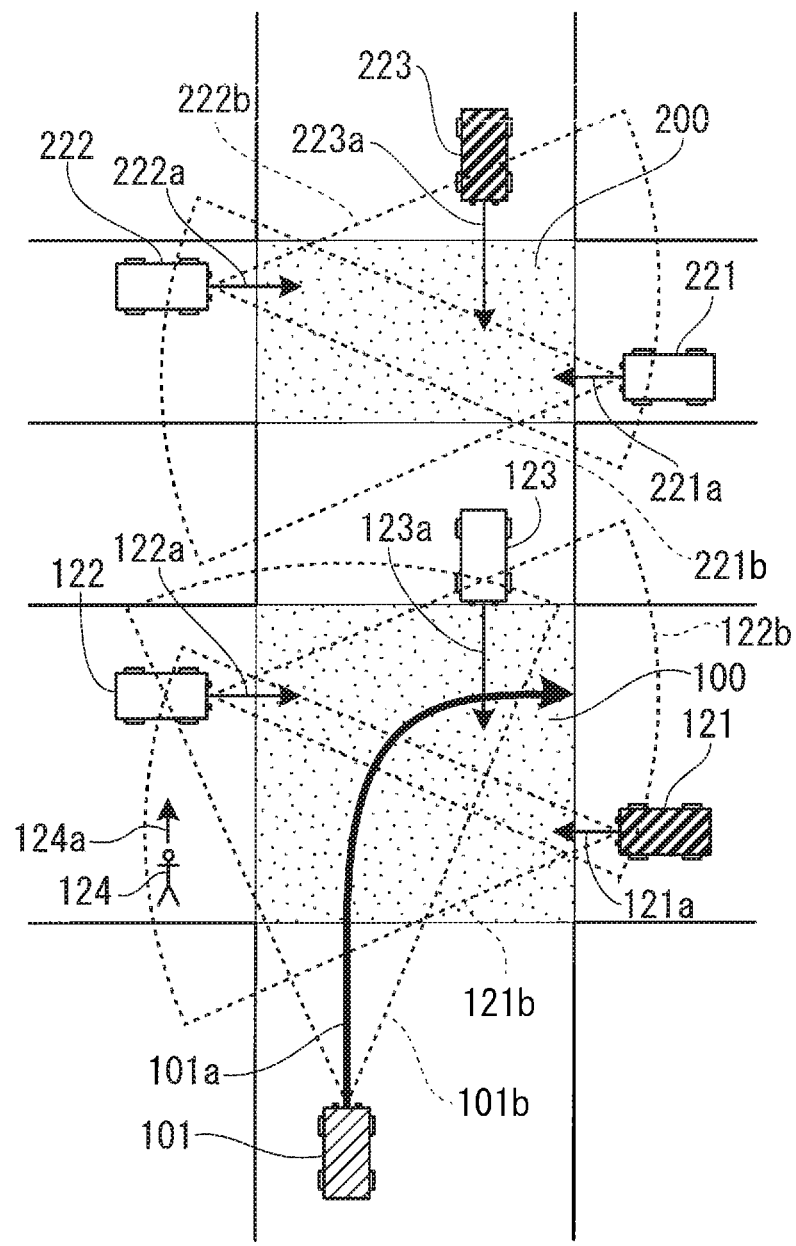
FIG. 5 is a diagram for explaining an operation example 2 of the navigation apparatus according to the preferred embodiment 1.

FIG. 5 is a diagram for explaining another example of the operation indicated by the flow chart in FIG. 3. A positional relationship shown in FIG. 5 is the same as the positional relationship shown in FIG. 4. In FIG. 5, the scheduled traveling route 101a of the own vehicle 101 indicates a route for turning right at the intersection 100, and the dead angle points which the own vehicle 101 travels are the intersection 100 and the sidewalk thereof.

In the case of the positional relationship shown in FIG. 5, the operation similar to that of the operation example 1 is performed from the steps S1 to S5.

Since the scheduled traveling route 101a of the own vehicle 101 intersects with the routes along which the other vehicles 121 and 223 travel at the intersection 100, the other vehicles 121 and 223 are determined to have the influence on the traveling of the own vehicle 101 in the step S6. In contrast, the detected object other than the other vehicles 121 and 223 detected in the step S3 are determined not to have the influence on the traveling of the own vehicle 101.

As a result, in the step S7, the navigation apparatus 1 of the own vehicle 101 gives notice, from the notification unit 4, of the other vehicles 121 and 223 as the travel influencing objects.

Operation Example 3

Figure 6:
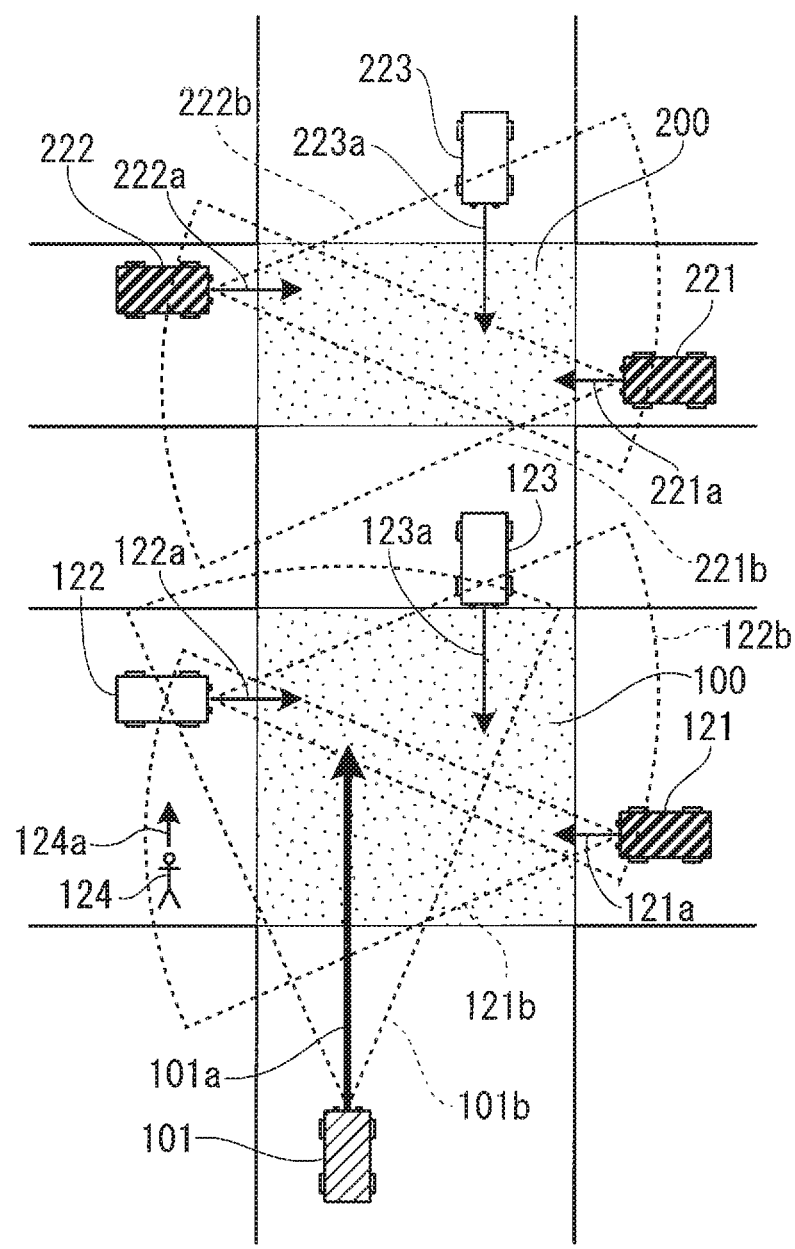
FIG. 6 is a diagram for explaining an operation example 3 of the navigation apparatus according to the preferred embodiment 1.

FIG. 6 is a diagram for explaining another example of the operation indicated by the flow chart in FIG. 3. A positional relationship shown in FIG. 6 is the same as the positional relationship shown in FIG. 4. In FIG. 6, the scheduled traveling route 101a of the own vehicle 101 indicates a route for going straight down the intersection 100, and the dead angle points which the own vehicle 101 travels are the intersections 100 and 200 and the sidewalks thereof.

In the case of the positional relationship shown in FIG. 6, the operation similar to that of the operation example 1 is performed from the steps S1 to S5.

Since the scheduled traveling route 101a of the own vehicle 101 intersects with the route along which the other vehicle 121 travels at the intersection 100 and also intersects with the routes along which the other vehicles 221 and 222 travel at the intersection 200, the other vehicles 121, 221, and 222 are determined to have the influence on the traveling of the own vehicle 101 in the step S6. In contrast, the detected object other than the other vehicles 121, 221, and 222 detected in the step S3 are determined not to have the influence on the traveling of the own vehicle 101.

As a result, in the step S7, the navigation apparatus 1 of the own vehicle 101 gives notice, from the notification unit 4, of the other vehicles 121, 221, and 222 as the travel influencing objects.

Effect

According to the navigation apparatus 1 according to the preferred embodiment 1 described above, in the dead angle point which the own vehicle 101 travels, a notice of the dead angle-detected object, which has the influence on the traveling of the own vehicle 101, is provided as the travel influencing object by the notification unit 4. Thus, the notice of warning of the dead angle-detected object, which has a low possibility of influencing on the traveling of the own vehicle 101, is not provided, however, the notice of warning of the dead angle-detected object, which has a high possibility of influencing on the traveling of the own vehicle 101, can be provided. Thus, a burden on the user of the own vehicle 101 can he reduced.

Since the above operation can be performed without using a scheduled traveling route of the other vehicle, the above effect can be obtained even in a ease where the other vehicle does not calculate or transmit the scheduled traveling route. Moreover, a notice of the other detected object, which may be an obstacle, such as a vehicle, a pedestrian, or a bicycle, on which no navigation apparatus 1 is mounted, can be provided as the travel influencing object. Furthermore, the above effect can also be obtained by using a directional antenna as the receiving antenna 25a or the transmission antenna 25c, or the above effect can also be obtained by using a versatile antenna.

Modification Example

In the above description, the navigation apparatus 1 of the own vehicle 101 does not transmit the information of the scheduled traveling route and also does not receive the information of the scheduled traveling route from navigation apparatus 1 of the other vehicle, however, the configuration is not limited to the above.

For example, it is assumed that in the example of FIG. 4, the navigation apparatus 1 of the other vehicle 121 guides a driver of the other vehicle 121 to a destination so that the other vehicle 121 goes straight at the intersection 100. In this case, the navigation apparatus 1 of the other vehicle 121 may transmit not only the detected object information of the other vehicle detected by the external sensor 28 of the other vehicle 121 but also a scheduled traveling information including a current position of the other vehicle 121 and a travel schedule which is the travel direction in the intersection 100 where the other vehicle 121 will travel soon (going straight in FIG. 4). The same is applied to navigation apparatus 1 of the own vehicle 101. According to the above configuration, an accuracy enhancement in the determination whether or not the detected object has the influence on the traveling of the own vehicle 101 can be expected.

As the above travel schedule, a direction of turning right or left soon and a point of turning right or left soon (not have to be the point where the vehicle will travel soon) may be indicated instead of the travel direction in the intersection 100 where the vehicle will travel soon.

In the above description using FIG. 6, the notice of the other vehicles 121, 221, and 222 is provided as the travel influencing objects from the notification unit 4. However, the configuration is not limited to the above, so that it is also applicable that the notice of the other vehicles 221 and 222 located far wary from the intersection 100 where the own vehicle 101 will travel soon is not provided as the travel influencing objects from the notification unit 4 as in a case of a preferred embodiment 2 described below.

FIG. 6 illustrates the display example of overlapping graphics indicating the positions of the other vehicles 121, 221, and 222 (substantial quadrilaterals each indicating a shape of an automobile) and arrows indicating the travel directions 121a, 221a, and 222a, however, the display configuration is not limited to the above. The same is applied to FIG. 4 and FIG. 5.

In the above description, the surrounding information detection unit 27 obtains the relative position of the detected object with respect to the position of the own vehicle 101 in the horizontal direction, that is to say, two unknown values corresponding to a two-dimensional coordinate, from the two detection values of the first distance and the second distance. However, the configuration is not limited to the above, so that the above relative position can be obtained from the two detection values relating to the positions of the own vehicle 101 and the detected object. For example, the surrounding information detection unit 27 may obtain the above relative position from detection values of the detecting direction of the radar 28c and the second distance.

In the constituent elements of the navigation apparatus 1, each of the current position detection unit 21, the route calculation unit 23, the surrounding information detection unit 27, and the route guide unit 7 may be achieved by causing each CPU, which is individually provided therein, to execute a program or may also be achieved by a single CPU executing a program.

The above modification example may also be applied not only to the preferred embodiment 1 but also to preferred embodiments 2 to 4 described below.

Preferred Embodiment 2

In the navigation apparatus 1 according to the preferred embodiment 2 of the present invention, the controller 3 has a configuration of causing the notification unit 4 not to give notice of the travel influencing object when the current position of the own vehicle 101 is located a longer distance away from the dead angle point which the own vehicle 101 will travel soon than the predetermined first distance based on the current position information of the own vehicle 101. Moreover, the controller 3 has a configuration of causing the notification unit 4 not to give notice of the travel influencing object which is located a longer distance away from the dead angle point which the own vehicle 101 will travel soon than the predetermined second distance based on the current position information of the detected object included in the detected object information. Other configuration and operation are similar to those of the preferred embodiment 1, thus the description is omitted here.

Operation

Figure 7:
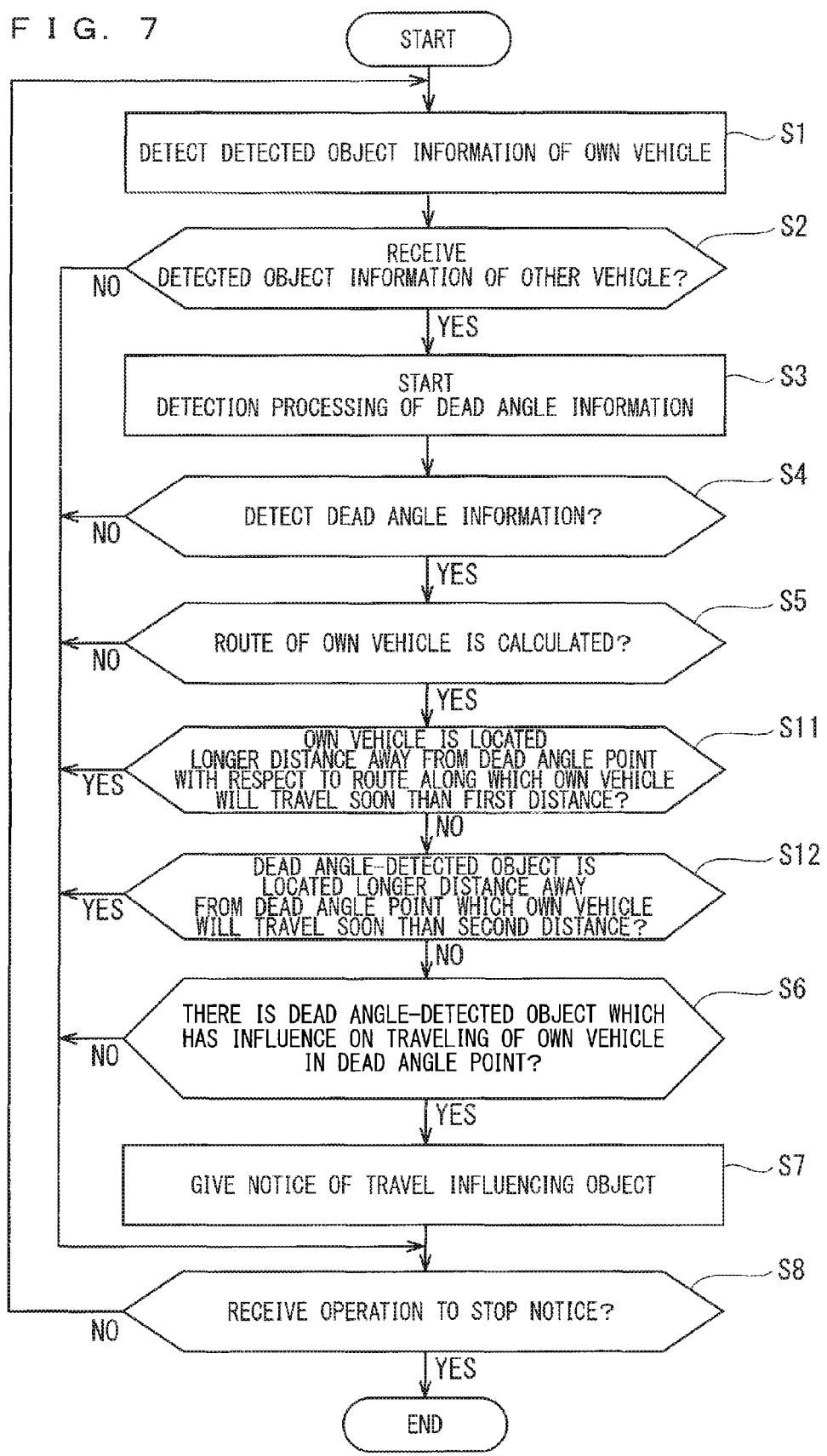
FIG. 7 is a flow chart showing an operation of a navigation apparatus according to a preferred embodiment 2.
Figure 8:
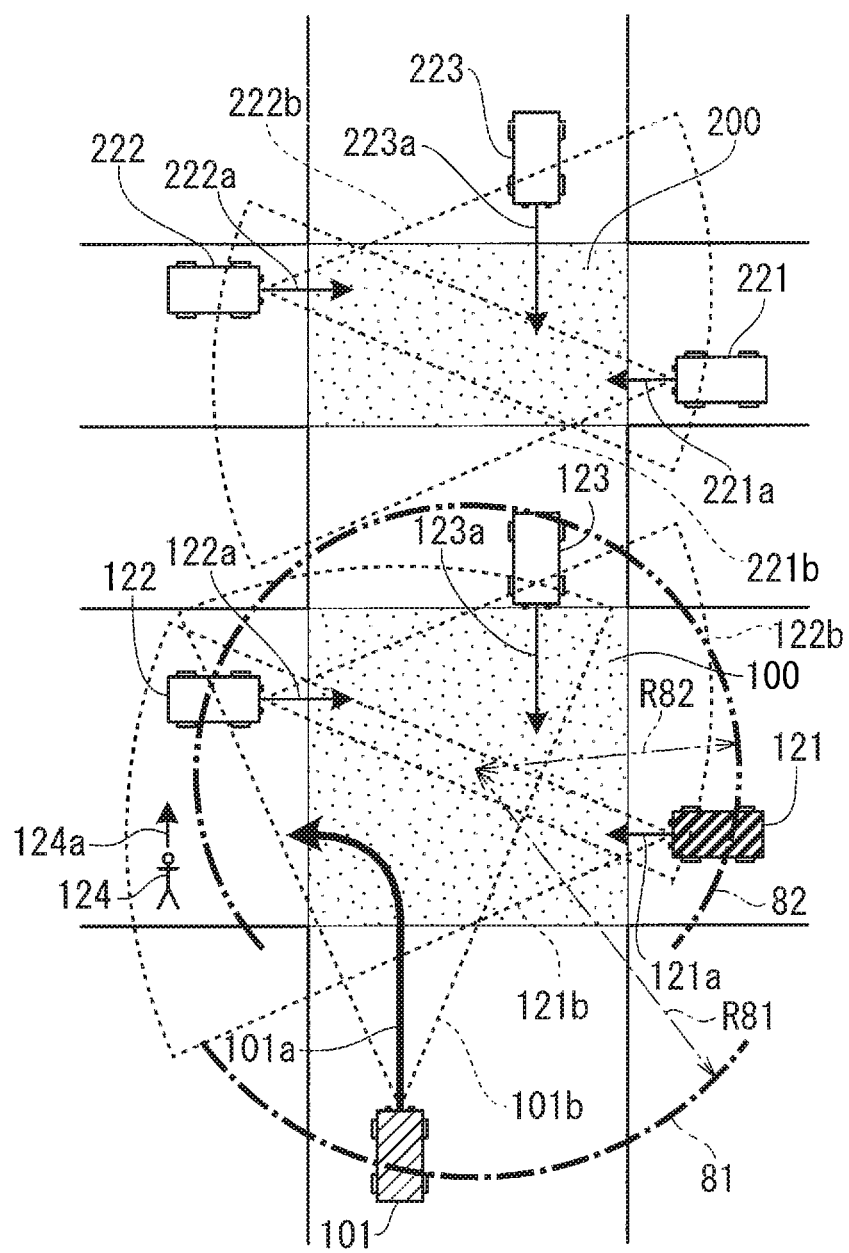
FIG. 8 is a drawing for explaining an operation example of the navigation apparatus according to the preferred embodiment 2.

FIG. 7 is a flow chart showing an operation of the navigation apparatus 1 of the own vehicle 101 according to the preferred embodiment 2, and FIG. 8 is a drawing for explaining an example of the operation.

The flow chart shown in FIG. 7 is the same as the flow chart shown in FIG. 3 except that steps S11 and S12 are added between the steps S5 and S6. Thus, the steps S11 and S12 are mainly described below.

In the step S11, the controller 3 calculates a distance between the own vehicle 101 and the dead angle point which the own vehicle 101 will travel soon based on the route information (scheduled traveling route), the current position detected by the current position detection unit 21, and the map data stored in the map data accumulation unit 6.

Subsequently, the controller 3 determines whether or not the calculated distance is longer than the predetermined first distance. Any value between 30 m to 110 m, for example, is applied to the first distance.

When the calculated distance is equal to or shorter than the first distance, the controller 3 determines that the own vehicle 101 is not located a longer distance away from the dead angle point which the own vehicle 101 will travel soon than the first distance, and the operation proceeds to the step S12. When the calculated distance is longer than the first distance, the controller 3 determines that the own vehicle 101 is located a longer distance away from the dead angle point which the own vehicle 101 will travel soon than the first distance, and the operation proceeds to the step S8.

FIG. 8 illustrates the same positional relationship as FIG. 4 of the preferred embodiment 1, and a part of a border line of a circular range 81, which is based on a center of the intersection 100 and has a radius of a first distance R81, is indicated by an alternate long and short dash line.

In the example of FIG. 8, the intersection 100 is the dead angle point which the own vehicle 101 will travel soon, and the intersection 200 is not the dead angle point which the own vehicle 101 will travel soon. Thus, the controller 3 determines that the own vehicle 101 is not located a longer distance away from the intersection 100, which is the dead angle point which the own vehicle 101 will travel soon, than the first distance R81 when the own vehicle 101 is located in the range 81 which overlaps the intersection 100, and otherwise, the controller 3 determines that the own vehicle 101 is located a longer distance away from the intersection 100 which is the dead angle point which the own vehicle 101 will travel soon than the first distance R81.

In the example of FIG. 8, the own vehicle 101 is located in the range 81, so that the operation proceeds to the step S12.

In the step S12, the controller 3 calculates a distance between the dead angle-detected object and the dead angle point which the own vehicle 101 will travel soon based on the route information (scheduled traveling route), the current position of the detected object included in the detected object information of the other vehicle received from the other vehicle, the map data stored in the map data accumulation unit 6, and the detection result in the step S3. When the own vehicle 101 can receive the travel schedule of the other vehicle, the distance may be calculated by using the current position of the other vehicle included in the travel schedule.

Subsequently, the controller 3 determines whether or not the calculated distance is longer than the predetermined second distance. Any value between 30 m to 110 m, for example, is applied to the second distance. The second distance may be the same as the first distance, or may differ from the first distance. The second distance may differ from road to road extending radially from the dead angle point.

When the calculated distance is equal to or shorter than the second distance, the controller 3 determines that the dead angle-detected object is not located a longer distance away from the dead angle point which the own vehicle 101 will travel soon than the second distance, and the operation proceeds to the step S6. When the calculated distance is longer than the second distance, the controller 3 determines that the dead angle-detected object is located a longer distance away from the dead angle point which the own vehicle 101 will travel soon than the second distance, and the operation proceeds to the step S8.

FIG. 8 illustrates a part of a border line of a circular range 82, which is based on a center of the intersection 100 and has a radius of a second distance R82, is indicated by an alternate long and two short dashes line.

In the example of FIG. 8, the intersection 100 is the dead angle point which the own vehicle 101 will travel soon, and the intersection 200 is not the dead angle point which the own vehicle 101 will travel soon. Thus, the controller 3 determines that the dead angle-detected object is not located a longer distance away from the intersection 100, which is the dead angle point which the own vehicle 101 will travel soon, than the second distance R82 when the dead angle-detected object is located in the range 82 which overlaps the intersection 100, and otherwise, the controller 3 determines that the dead angle-detected object is located a longer distance away from the intersection 100 which is the dead angle point which the own vehicle 101 will travel soon than the second distance R82.

In the example of FIG. 8, the detected objects in the dead angle area are the other vehicles 121, 221, 222, and 223 and the pedestrian 124, and from among them, the other vehicle 121 is located in the range 82, so that the operation proceeds to the step S6. As a result, in the preferred embodiment 1, in the case of the positional relationship shown in FIG. 4, the notice of the other vehicles 121 and the pedestrian 124 is provided as the travel influencing objects, however, in the preferred embodiment 2, in the case of the positional relationship shown in FIG. 8, which illustrates the same positional relationship as FIG. 4, the notice of the pedestrian 124 is not provided as the travel influencing object but the notice of the other vehicle 121 is provided as the travel influencing object.

Effect

The navigation apparatus 1 according to the preferred embodiment 1 gives notice of the dead angle-detected object which has the influence on the traveling of the own vehicle 101 in the dead angle point as the travel influencing object. This notice is provided regardless of whether or not the dead angle point, which is subject to the notice, is the dead angle point which the own vehicle 101 will travel soon, and this notice is also provided regardless of the distance between the own vehicle 101 and the dead angle point. However, when the current position of the own vehicle 101 is far away from the dead angle point which the own vehicle 101 will travel soon, it is considered that the dead angle-detected object in the dead angle point does not have a high possibility of influencing on the traveling of the own vehicle 101 at present, even though the dead angle-detected object in the dead angle point may have the possibility of influencing on the traveling of the own vehicle 101 in the future.

In the meanwhile, the navigation apparatus 1 according to the preferred embodiment 2 does not give notice, from the notification unit 4, of the dead angle-detected object, which is the travel influencing object, when the own vehicle 101 is located a longer distance away from the dead angle point which the own vehicle 101 will travel soon than the first distance R81. Accordingly, the possibility of giving notice of warning only of the dead angle-detected object which is significant for the traveling of the own vehicle 101 can be further enhanced, so that the burden on the user of the own vehicle 101 can be further reduced.

The notice in the preferred embodiment 1 is provided regardless of whether or not the dead angle point, which is subject to the notice, is the dead angle point which the own vehicle 101 will travel soon, and this notice is also provided regardless of the distance between the dead angle-detected object and the dead angle point. However, when the current position of the dead angle-detected object is far away from the dead angle point which the own vehicle 101 will travel soon, it is considered that the dead angle-detected object does not have a high possibility of influencing on the traveling of the own vehicle 101 at present.

In the meanwhile, in the preferred embodiment 2, the notice of the dead angle-detected object, which is the travel influencing object, is not provided from the notification unit 4 when the dead angle-detected object is located a longer distance away from the dead angle point which the own vehicle 101 will travel soon than the second distance R82. Accordingly, the possibility of giving notice of warning only of the dead angle-detected object which is significant for the traveling of the own vehicle 101 can be further enhanced, so that the burden on the user of the own vehicle 101 can be further reduced.

Preferred Embodiment 3

The navigation apparatus 1 according to the preferred embodiment 3 of the present invention has a configuration of determining the first distance described in the preferred embodiment 2 based on a speed information of the own vehicle 101 and determining the second distance described in the preferred embodiment 2 based on a speed information of the travel influencing object, which is the moving body. Other configuration and operation are similar to those of the preferred embodiment 2, thus the description is omitted here.

Operation

Figure 9:
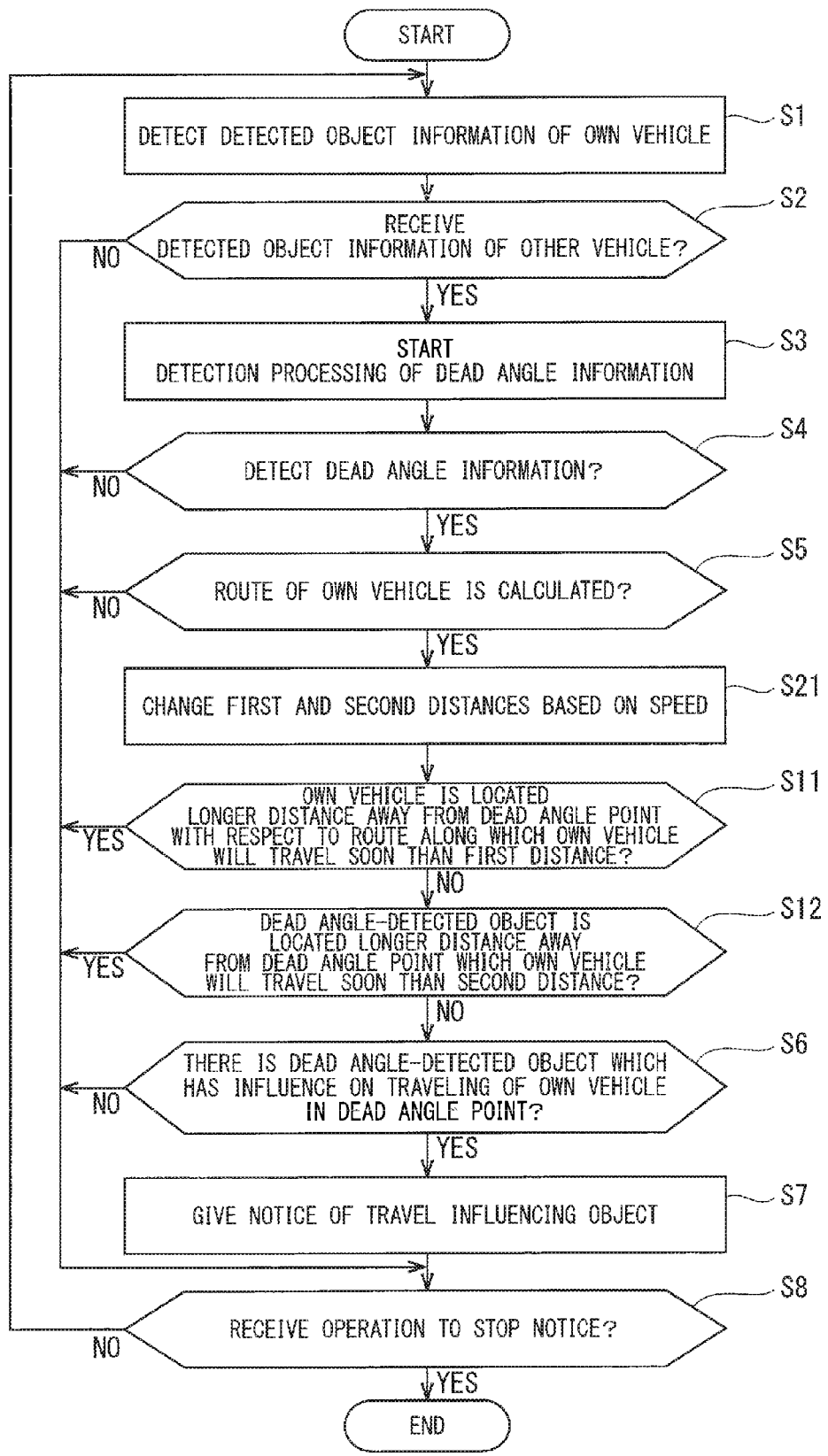
FIG. 9 is a flow chart showing an operation of a navigation apparatus according to a preferred embodiment 3.
Figure 10:
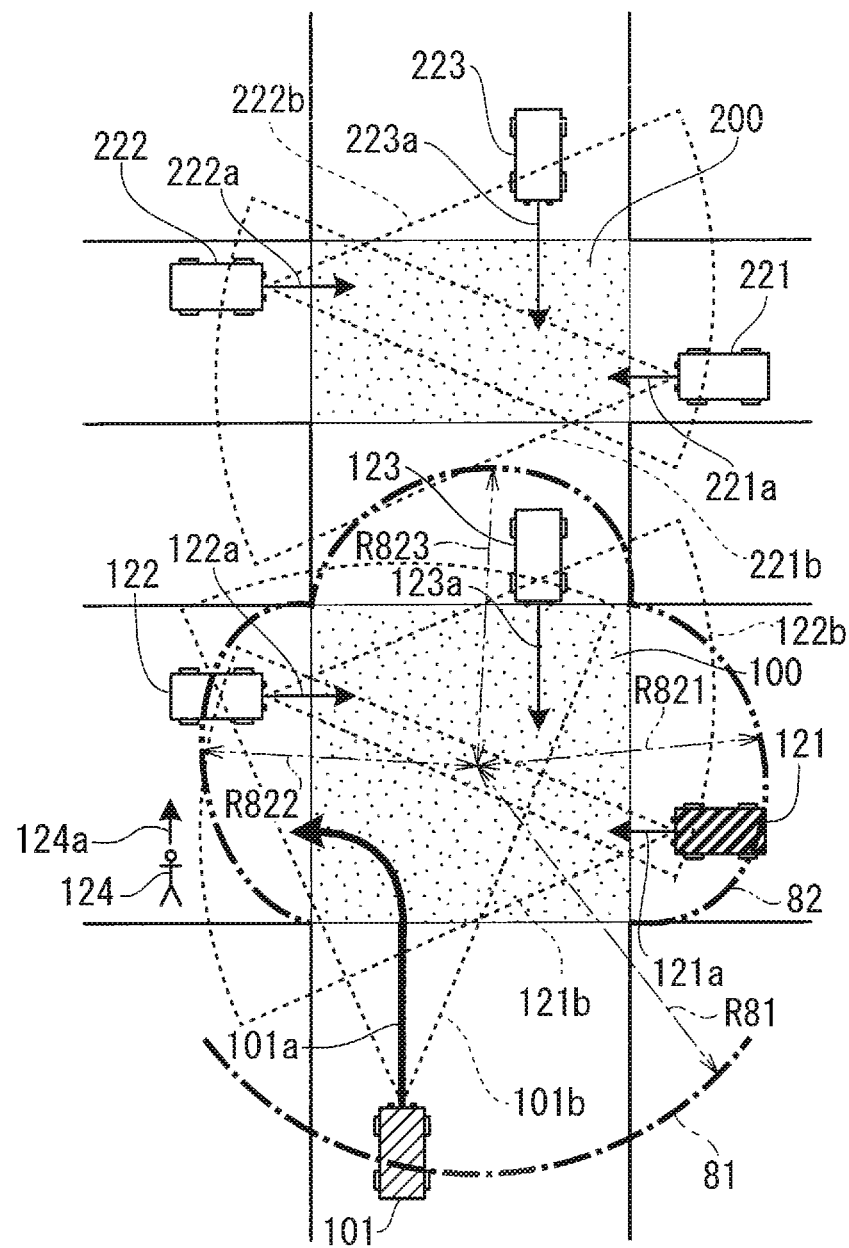
FIG. 10 is a drawing for explaining an operation example of the navigation apparatus according to the preferred embodiment 3.

FIG. 9 is a flow chart showing an operation of the navigation apparatus 1 of the own vehicle 101 according to the present preferred embodiment 3, and FIG. 10 is a drawing for explaining an example of the operation.

The flow chart shown in FIG. 9 is the same as the flow chart shown in FIG. 7 except that a step S21 is added between the steps S5 and S11. Thus, the step S21 is mainly described below.

In the step S21, the controller 3 changes the first distance used as a threshold value in the step S11 based on a travel speed (the speed information) of the vehicle 101 detected by the pulse detection unit 21c (FIG. 2). In a case of an example of FIG. 10, the controller 3 reduces the first distance R81 as the travel speed of the own vehicle 101 decreases, and increases the first distance R81 as the travel speed of the own vehicle 101 increases.

The controller 3 changes the second distance used as a threshold value in the step S12 based on a moving speed (a speed information of the moving body which is the travel influencing object) indicated by a speed vector included in the detected object information of the other vehicle. In the example of FIG. 10, the second distance R82 is individually defined as second distances R821, R822, and R823 for the other vehicles 121, 122, and 123. Although the second distance R82 is also individually defined for the pedestrian 124, its definition is similar to that of the other vehicles 121, 122, and 123, so that the description is omitted.

In the case of the example of FIG. 10, the controller 3 reduces each of the second distances R821, R822, and R823 as the moving speed of each of the other vehicles 121, 122, and 123 decreases, and increases each of the second distance R821, R822, and R823 as the moving speed of each of the other vehicles 121, 122, and 123 increases.

Herein, as the first distance R81 and the second distances R821, R822, and R823, a distance obtained by adding a distance of a margin (10 m, for example) to a known stopping distance (a free running distance+a braking distance) which changes in accordance with the speed of the vehicle is applied.

After the above step S21 is completed, the operation proceeds to the step S11 and the operation similar to the preferred embodiment 2 is performed.

Effect

When the travel speed of the own vehicle 101 is small, the navigation apparatus 1 according to the present preferred embodiment 3 described above reduces the first distance R81 on the ground that an entering time required for the own vehicle 101 to entering the dead angle point is made long, thereby enabling a timing of starting the notice of the travel influencing object to be delayed. In contrast, when the travel speed of the own vehicle 101 is large, the navigation apparatus 1 according to the preferred embodiment 3 increases the first distance R81 on the ground that the entering time is made short, thereby enabling a timing of starting the notice of the travel influencing object to be hastened. That is to say, the travel influencing object whose notice is provided can be narrowed down in accordance with the travel speed of the own vehicle 101. Accordingly, the possibility of giving notice of warning only of the dead angle-detected object which is significant for the traveling of the own vehicle 101 can be further enhanced, so that the burden on the user of the own vehicle 101 can be further reduced.

In the present preferred embodiment 3, when the moving speed of the travel influencing object (the dead angle-detected object) is small, the second distance R82 is reduced on the ground that an entering time required for the travel influencing object to entering the dead angle point is made long, so that a timing of starting the notice of the travel influencing object can be delayed. In contrast, when the moving speed of the travel influencing object is large, the second distance R82 is increased on the ground that the entering time is made short, so that a timing of starting the notice of the travel influencing object can be hastened. That is to say, the travel influencing object whose notice is provided can be narrowed down in accordance with the travel speed of the travel influencing object. Accordingly, the possibility of giving notice of warning only of the dead angle-detected object which is significant for the traveling of the own vehicle 101 can be further enhanced, so that the burden on the user of the own vehicle 101 can be further reduced.

Modification Example

In the above description, the distance obtained by adding the distance of the margin to the known stopping distance is applied to the first and second distances. However, the configuration is not limited to the above, so that a distance calculated from a proportional expression of the speeds of the own vehicle and dead angle-detected object may be applied to the first and second distances, or a distance associated with the speeds using a table may also be applied. When the first and second distances increase more than necessary, a total number of the travel influencing objects whose notices are provided also increases. Thus, an upper limit may be set on the first and second distances.

Preferred Embodiment 4

In the navigation apparatus 1 according to a preferred embodiment 4 of the present application, the controller 3 has a configuration of causing the notification unit 4 not to give notice of the moving object, which is the travel influencing object which does not travel simultaneously with the own vehicle in the dead angle point, when a traffic signal is disposed in the dead angle point. The map data stored in the map data accumulation unit 6 includes a traffic signal presence/absence information indicating a presence/absence of the traffic signal in the dead angle point. Other configuration and operation are similar to those of the preferred embodiment 1, thus the description is omitted here.

Operation

Figure 11:
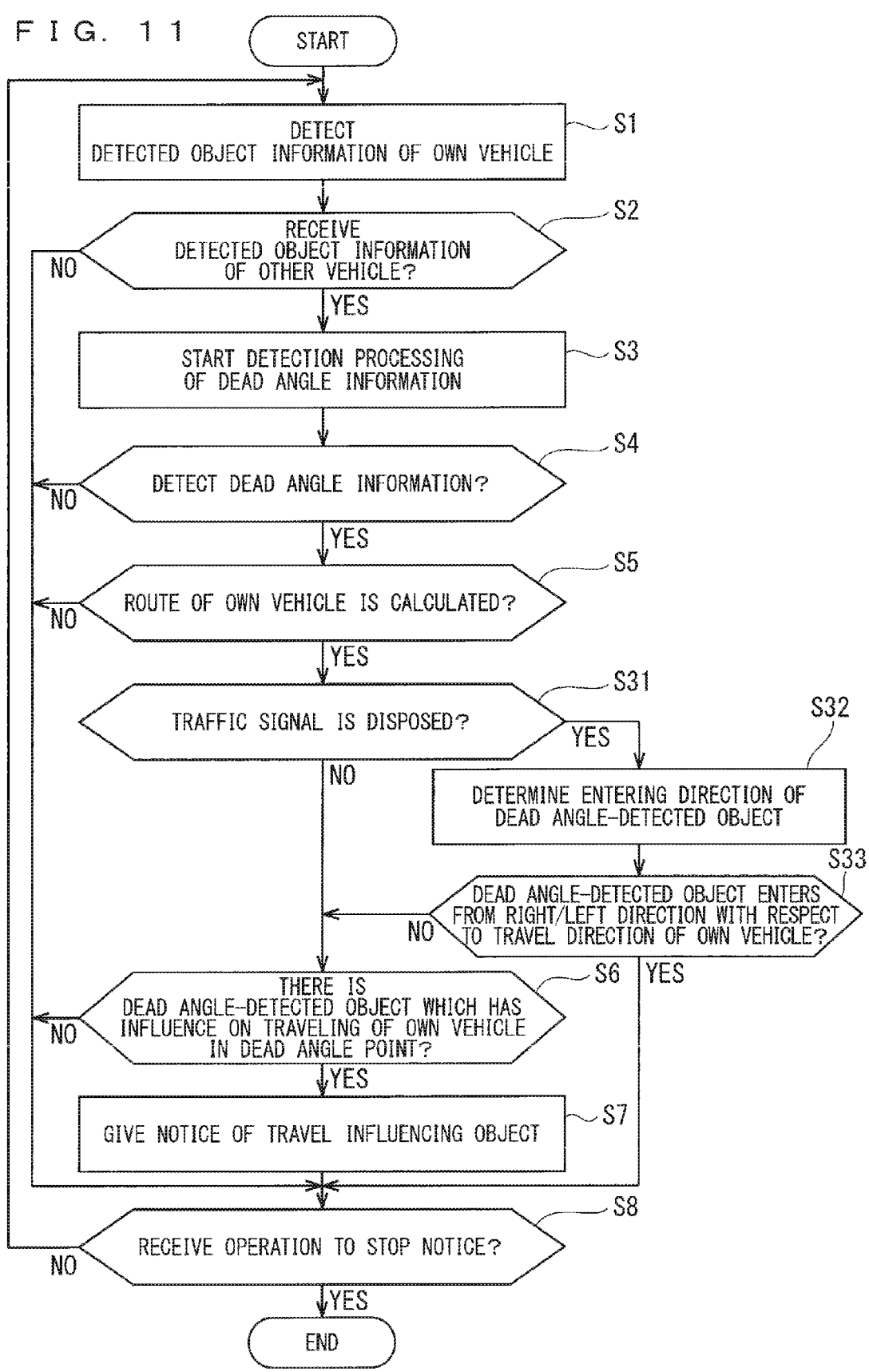
FIG. 11 is a flow chart showing an operation of a navigation apparatus according to a preferred embodiment 4.
Figure 12:
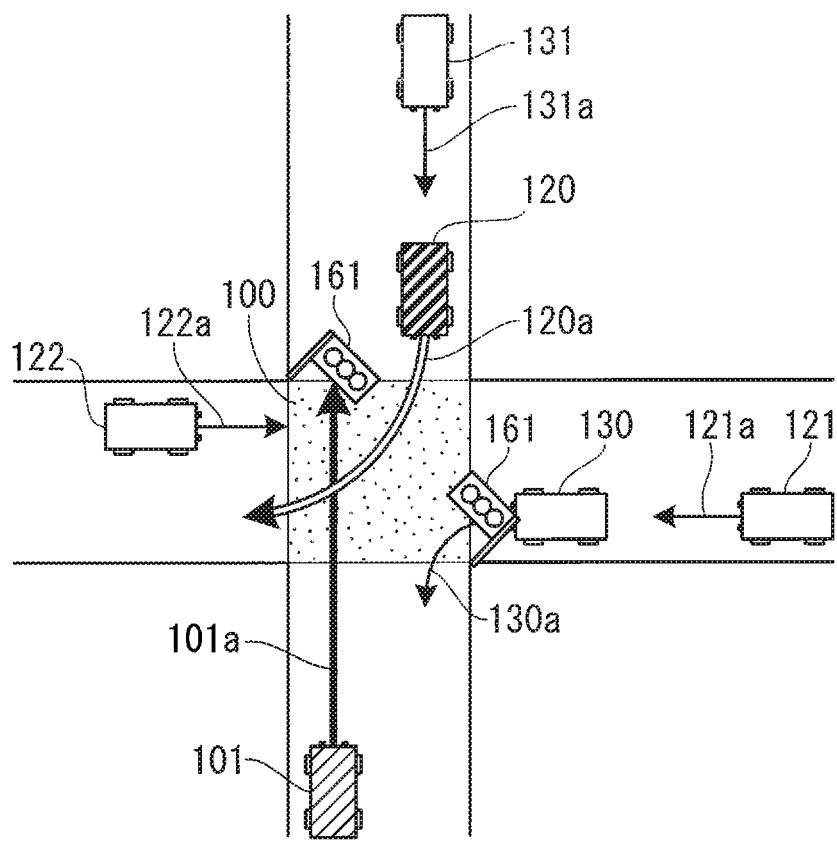
FIG. 12 is a drawing for explaining an operation example of the navigation apparatus according to the preferred embodiment 4.

FIG. 11 is a flow chart showing an operation of the navigation apparatus 1 of the own vehicle 101 according to the present preferred embodiment 4, and FIG. 12 is a drawing for explaining an example of the operation.

The flow chart shown in FIG. 11 is the same as the flow chart shown in FIG. 3 except that steps S31, S32, and S33 are added between the steps S5 and S6. Thus, the steps S31 to S33 are mainly described below. In the description below, the dead angle point is assumed to be an intersection, however, the configuration is not limited to the description below.

In the step S31, the controller 3 determines whether or not the traffic signal is disposed in the intersection where the own vehicle 101 travels based on the scheduled traveling route (the route calculated by the route calculation unit 23), the dead angle information which is determined to be detected in the step S4, and the map data stored in the map data accumulation unit 6. When it is determined that the traffic signal is disposed, the operation proceeds to the step S32, and when it is determined that the traffic signal is not disposed, the operation proceeds to the step S6.

In the step S32, the controller 3 determines a direction of the dead angle-detected object entering the intersection. Herein, the controller 3 determines the direction of entering the intersection based on a speed information (a speed vector) included in the detected object information of the other vehicle.

In the step S33, the controller 3 determines whether or not the dead angle-detected object enters the intersection from a right/left direction with respect to the travel direction of the own vehicle 101 based on the scheduled traveling route and the determination result in the step S32. When the dead angle-detected object enters the intersection from the right/left direction, the operation proceeds to the step S8, and when the dead angle-detected object does not enter the intersection from the right/left direction, the operation proceeds to the step S6. The dead angle-detected object which enters the intersection, where the traffic signal is disposed, from the right/left direction with respect to the travel direction of the own vehicle 101 corresponds to the dead angle-detected object which does not travel simultaneously with the own vehicle 101 in the intersection.

FIG. 12 shows the own vehicle 101, the scheduled travel route 101a of the own vehicle 101, the other vehicles 120, 121, 122, 130, and 131, and the travel directions 120a, 121a, 122a, 130a, and 131a thereof.

In the example of FIG. 12, a traffic signal 161 is disposed in the intersection 100 (the dead angle point which the own vehicle 101 travels), and the travel influencing objects (the dead angle-detected object) are the other vehicles 120 and 122. In this case, the controller 3 causes the notification unit 4 not to give notice of the other vehicle 122 which does not travel simultaneously with the own vehicle 101 in the intersection 100.

Effect

The navigation apparatus 1 according to the preferred embodiment 1 gives notice of the dead angle-detected object which has the influence on the traveling of the own vehicle 101 in the dead angle point as the travel influencing object. The notice of the travel influencing object is provided regardless of whether or not the dead angle-detected object travels simultaneously with the own vehicle 101 in the dead angle point where the traffic signal 161 is disposed. However, it is considered that the dead angle-detected object which does not travel simultaneously with the own vehicle 101 in the dead angle point where the traffic signal 161 is disposed does not have a high possibility of influencing on the traveling of the own vehicle 101.

Thus, the navigation apparatus 1 according to the preferred embodiment 4 causes the notification unit 4 not to give notice of travel influencing object (the dead angle-detected object) which does not travel simultaneously with the own vehicle 101 in the dead angle point where the traffic signal 161 is disposed. Accordingly, the possibility of giving notice of warning only of the dead angle-detected object which is significant for the traveling of the own vehicle 101 can be further enhanced, so that the burden on the user of the own vehicle 101 can be further reduced.

Another Modification Example

Figure 13:
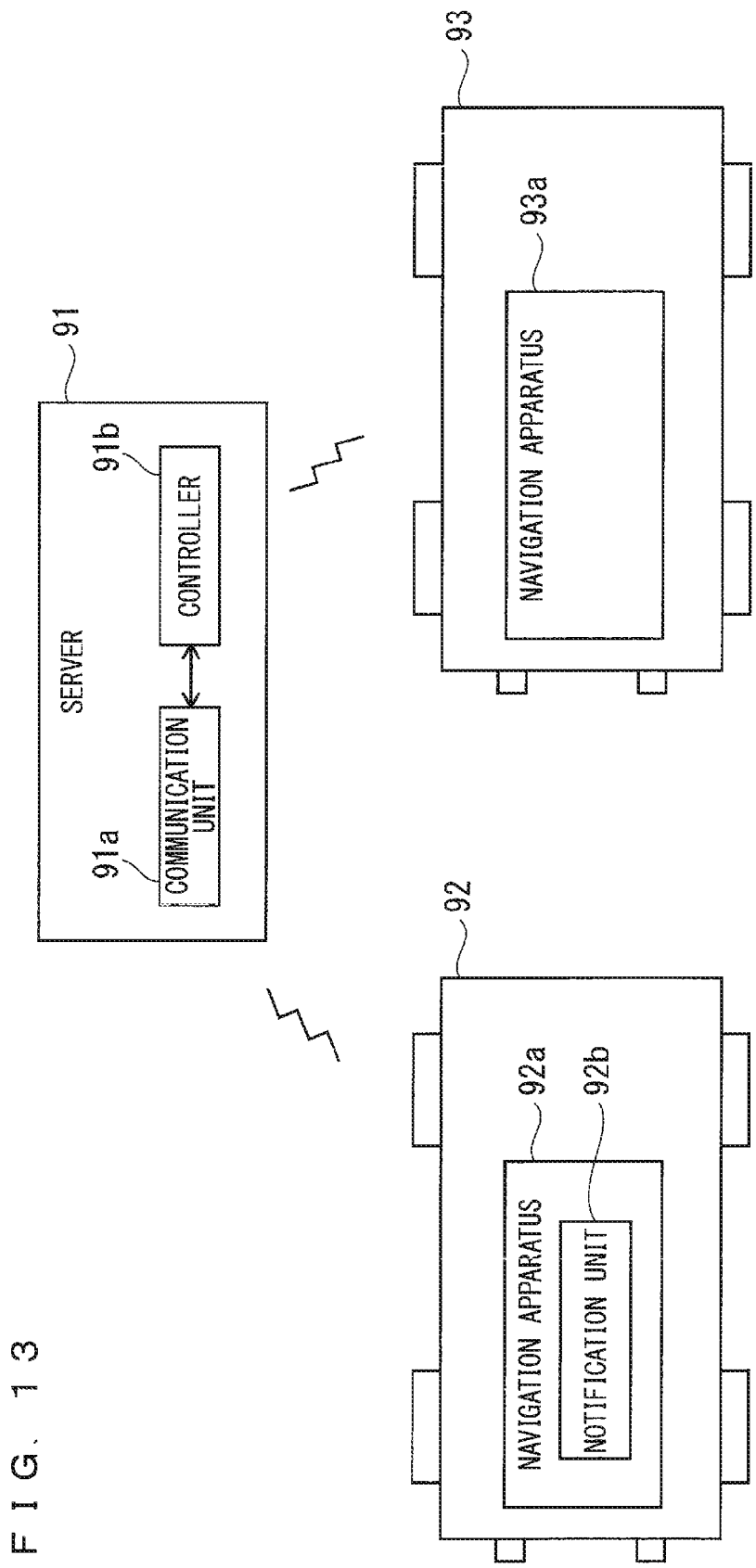
FIG. 13 is a block diagram showing a principal configuration of a server according to another modification example.

FIG. 13 is a block diagram showing a principal configuration of a server 91 according to the present modification example. The server 91 in FIG. 13 is provided with a communication unit 91*a* and a controller 91*b* which correspond to the information acquisition unit 2 and the controller 3 described above, respectively. A navigation apparatus 92*a* and a navigation apparatus 93*a* are mounted on a first vehicle 92 and a second vehicle 93 in FIG. 13, respectively, and the navigation apparatus 92*a* is provided with a notification unit 92*b* which corresponds to the notification unit 4 described above.

The communication unit 91*a* performs communication with the navigation apparatuses 92*a* and 93*a*, thereby receiving (obtaining) a route information of the first vehicle 92, a current position information of the first vehicle 92, and a detected object information regarding a detected object around the first and second vehicles 92 and 93 detected by their own, respectively.

The controller 91*b* is achieved as a function of CPU not shown of the server 91 which executes a program stored in a storage device such as a semiconductor memory not shown of the server 91, for example.

The controller 91*b* of the server 91 controls a notice from the notification unit 92*b* in the navigation apparatus 92*a* via the communication unit 91*a*. Herein, the controller 91*b* causes the notification unit 92*b* in the first vehicle 92 to give notice of the detected object, which is determined to have the influence on the traveling of the first vehicle 92 in the dead angle point which the first vehicle 92 travels from among the detected object which is not detected by the first vehicle 92 but detected by the second vehicle 93, as the travel influencing object based on the route information of the first vehicle 92, the current position information of the first vehicle 92, and the detected object information of the first and second vehicles 92 and 93 which are received by the communication unit 91*a*. According to the server 91 having such a configuration, the effect similar to the preferred embodiment 1 can be obtained.

FIG. 14 a block diagram showing a principal configuration of a communication terminal 96 according to the present modification example. The communication terminal 96 in FIG. 14 is provided with a communication unit 96*a* and a controller 96*b* which correspond to the information acquisition unit 2 and the controller 3 described above, respectively. The communication terminal 96 includes a mobile terminal such as a mobile phone, a smartphone, and a tablet and a personal computer, for example. A navigation apparatus 97*a* and a navigation apparatus 98*a* are mounted on a first vehicle 97 and a second vehicle 98 in FIG. 14, respectively, and the navigation apparatus 97*a* is provided with a notification unit 97*b* which corresponds to the notification unit 4 described above.

The communication unit 96*a* performs communication with the navigation apparatuses 97*a* and 98*a*, thereby receiving (obtaining) a route information of the first vehicle 97, a current position information of the first vehicle 97, and a detected object information regarding a detected object around the first and second vehicles 97 and 98 detected by their own, respectively.

The controller 96*b* is achieved as a function of CPU not shown of the communication terminal 96 which executes a program stored in a storage device such as a semiconductor memory not shown of the communication terminal 96, for example.

The controller 96*b* of communication terminal 96 controls a notice from the notification unit 97*b* in the navigation apparatus 97*a* via the communication unit 96*a*. Herein, the controller 96*b* causes the notification unit 97*b* in the first vehicle 97 to give notice of the detected object, which is determined to have the influence on the traveling of the first vehicle 97 in the dead angle point which the first vehicle 97 travels from among the detected object which is not detected by the first vehicle 97 but detected by the second vehicle 98, as the travel influencing object based on the route information of the first vehicle 97, the current position information of the first vehicle 97, and the detected object information of the first and second vehicles 97 and 98 which are received by the communication unit 96*a*. According to the communication terminal 96 having such a configuration, the effect similar to the preferred embodiment 1 can be obtained.

As described above, the navigation apparatus 1 having the above configuration can be applied not only to the navigation apparatus which can be mounted on the vehicle but also to a Portable Navigation Device, a communication terminal (a mobile terminal such as a mobile phone, a smartphone, and a tablet, for example), an application function installed on the Portable Navigation Device and the communication terminal, and a driving support system established as a system by appropriately combining a server, for example. In this case, each function or each constituent element of the navigation apparatus 1 described above may be disposed separately in each equipment which establishes the system or may also be disposed collectively in one equipment.

In the present invention, the above preferred embodiments and modification examples can be arbitrarily combined, or each preferred embodiment and modification examples can be appropriately varied or omitted within the scope of the invention.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1: Navigation apparatus, 2: Information acquisition unit, 3, 91*b*, 96*b*: Controller, 4, 92*b*, 97*b*: Notification unit, 81, 82: Range, 91: server, 91*a*, 96*a*: Communication unit, 92, 97: First vehicle, 93, 98: Second vehicle, 96: Communication terminal, 100, 200: Intersection, 101: Own vehicle, 101*a*: Scheduled travel route, 120, 121, 122, 123, 130, 131, 221, 222, 223: Other vehicle, 120*a*, 121*a*, 122*a*, 123*a*, 130*a*, 131*a*, 124*a*, 221*a*, 222*a*, 223*a*: Moving direction, 124: Pedestrian, R81: First distance, R82, R821, R822, R823: Second distance.

The invention claimed is:

1. A driving support apparatus that supports vehicle travel using a notification unit, comprising:

a surrounding information detection unit that obtains detected object information about surrounding objects detected by a first vehicle in which the driving support apparatus is positioned;

an antenna that receives information about objects detected by one or more vehicles other than the first vehicle and scheduled traveling information for the one or more other vehicles;

an information receiver that obtains route information of the first vehicle, the route information including a scheduled traveling route along which said first vehicle is going to travel, and current position information of said first vehicle; and a controller configured to compare objects detected by the first vehicle with objects detected by the one or more other vehicles based on said object information obtained by said surrounding information detection and said information received by said antenna;

determine dead angle objects based on the comparison, a dead angle object being an object detected by one of the one or more other vehicles and not detected by the first vehicle;

determine whether any of the determined dead angle objects have an influence on a traveling of said first vehicle in a dead angle point on said scheduled traveling route along which said first vehicle travels based on said route information of said first vehicle, said current position information of said first vehicle, and said scheduled traveling information of said one or more other vehicles, and notify a user of the first vehicle of any dead angle objects determined to have influence on the travel of said first vehicle.

2. The driving support apparatus according to claim 1, wherein said controller is further configured to not notify the user of the first vehicle of said travel influencing dead angle object when a current position of said first vehicle is located a longer distance away from said dead angle point on said scheduled traveling route along which said first vehicle will travel soon than a predetermined first distance based on said current position information of said first vehicle.

3. The driving support apparatus according to claim 2, wherein said information receiver further obtains speed information of said first vehicle, and said first predetermined distance is determined based on said speed information of said first vehicle.

4. The driving support apparatus according to claim 1, wherein said detected object information includes a current position information of said detected object, and said controller is further configured to not notify the user of the first vehicle of said travel influencing dead angle object which is located a longer distance away from said dead angle point on said scheduled traveling route along which said first vehicle will travel soon than a predetermined second distance based on said current position information of said detected object.

5. The driving support apparatus according to claim 4, wherein said travel influencing dead angle object is a moving body, said detected object information further includes speed information of said moving body, and said second predetermined distance is determined based on said speed information of said moving body which is said travel influencing dead angle object.

6. The driving support apparatus according to claim 1, wherein said travel influencing dead angle object is a moving body, said detected object information includes current position information of said moving body, and said controller is further configured to not notify the user of the first vehicle of said moving object, which is said travel influencing dead angle object which does not travel simultaneously with said first vehicle in said dead angle point when a traffic signal is disposed in said dead angle point.

7. A driving support method of supporting vehicle travel using a notification unit, comprising steps of:

obtaining, from an object detector, detected object information about surrounding objects detected by a first vehicle in which the object detector is positioned;

receiving, using an antenna, information about objects detected by one or more vehicles other than the first vehicle and scheduled traveling information for the one or more other vehicles;

obtaining route information of the first vehicle, the route information including a scheduled traveling route along which said first vehicle is going to travel, and current position information of said first vehicle;

comparing, using a processor, objects detected by the first vehicle with objects detected by the one or more other vehicles based on said detected object information obtained by said object detection and said information received by said antenna;

determining, using a processor, dead angle objects based on the comparison, a dead angle object being an object detected by one of the one or more other vehicles and not detected by the first vehicle;

determining, using a processor, whether any of the determined dead angle objects have an influence on a traveling of said first vehicle in a dead angle point on said scheduled traveling route along which said first vehicle travels based on said route information of said first vehicle, said current position information of said first vehicle, and said scheduled traveling information of said one or more other vehicles; and notifying, using an output device, a user of the first vehicle of any dead angle objects determined to have influence on the travel of said first vehicle.

* * * * *